April 14, 1959   L. G. S. BROOKER ET AL   2,882,159
MEROCYANINE SENSITIZING DYES AND PHOTOGRAPHIC
EMULSIONS CONTAINING THEM
Filed Sept. 13, 1956

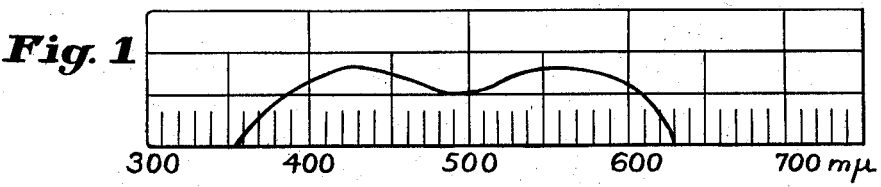

3-ETHYL-5-[2-(3-METHYL-2(3H)-BENZOTHIAZOLYLIDENE)-
CYCLOPENTYLIDENE] RHODANINE.

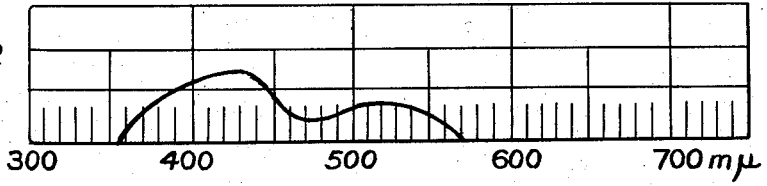

3-ETHYL-5-[2-(3-METHYL-2(3H)-BENZOTHIAZOLYLIDENE)-
CYCLOPENTYLIDENE]-2-THIO-2,4-OXAZOLIDINEDIONE.

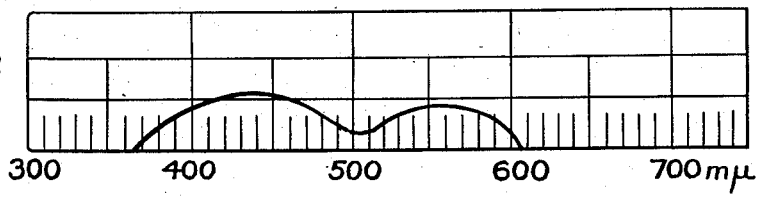

3-ETHYL-5-[2-(3-METHYL-2(3H)-BENZOTHIAZOLYLIDENE)-
CYCLOPENTYLIDENE]-1-PHENYL-2-THIOHYDANTOIN.

Leslie G.S. Brooker
Frank L. White
INVENTORS

BY
ATTORNEYS

# 2,882,159

MEROCYANINE SENSITIZING DYES AND PHOTOGRAPHIC EMULSIONS CONTAINING THEM

Leslie G. S. Brooker and Frank L. White, Rochester, N.Y., assignors to Eastman Kodak Company, Rochester, N.Y., a corporation of New Jersey Application September 13, 1956, Serial No. 609,524

9 Claims. (Cl. 96—102)

This invention relates to new merocyanine dyes, a method for making such dyes, and to photographic silver halide emulsions spectrally sensitized with such dyes.

It is, therefore, an object of our invention to provide new merocyanine dyes. Another object is to provide a method for making these new dyes. Still another object is to provide intermediates for making these new dyes. Another object is to provide photographic silver halide emulsions spectrally sensitized with the new merocyanine dyes of our invention. Other objects will become apparent from a consideration of the following description and examples.

The merocyanine dyes of our invention comprise those dyes represented by the following general formula:

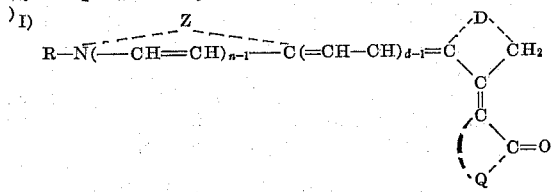

wherein R represents an alkyl group (e.g., methyl, ethyl, n-propyl, n-butyl, isobutyl, n-amyl, isoamyl, β-methoxyethyl, β-ethoxyethyl, allyl (i.e., vinylmethyl), benzyl (phenylmethyl), β-phenylethyl, carboxymethyl, etc.), (especially alkyl groups containing from 1 to 4 carbon atoms), $d$ and $n$ each represents a positive integer of from 1 to 2, D represents the atoms necessary to complete a cyclopentane ring or cyclohexane ring, Q represents the nonmetallic atoms necessary to complete a nucleus of the indandione series (e.g., 1,3-diketohydrinedene, etc.) or a heterocyclic nucleus containing from 5 to 6 atoms in the heterocyclic ring, such as those of the pyrazolone series (e.g., 3-methyl-1-phenyl-5-pyrazolone, 1-phenyl-5-pyrazolone, 1-(2-benzothiazolyl)-3-methyl-5-pyrazolone, etc.), those of the isoxazolone series (e.g., 3-phenyl-5(4H)-isoxazolone, 3-methyl-5(4H)-isoxazolone, etc.), those of the oxindole series (e.g., 1-alkyl-2,3-dihydro-2-oxindoles, etc.), those of the 2,4,6-triketohexahydropyrimidine series (e.g., barbituric acid or 2-thiobarbituric acid as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, 1,3-diisopropyl, 1,3-dicyclohexyl, 1,3-di (β-methoxyethyl), etc.), or 1,3-diaryl (e.g., 1,3-diphenyl, 1,3-di(p-chlorophenyl), 1,3-di(p-ethoxycarbonylphenyl), etc.), or 1-aryl (e.g., 1-phenyl, 1-p-chlorophenyl, 1-p-ethoxycarbonylphenyl), etc.) or 1-alkyl-3-aryl (e.g., 1-ethyl-3-phenyl, 1-n-heptyl-3-phenyl, etc.) derivatives), those of the rhodanine series (i.e., 2-thio-2,4-thiazolidinedione series), such as rhodanine, 3-alkylrhodanines (e.g., 3-ethylrhodanine, 3-allyl-rhodanine, etc.) or 3-arylrhodanines (e.g., 3-phenylrhodanine, etc.), etc., those of the 2(3H)-imidazo[1,2-a]pyridone series, those of the 5,7-dioxo-6,7-dihydro-5-thiazolo[3,2-a]pyrimidine series (e.g., 5,7 - dioxo-3-phenyl-6,7-dihydro-5-thiazolo[3,2-a]-pyrimidine, etc.), those of the 2-thio-2,4-oxazolidinedione series (i.e., those of the 2-thio-2,4(3H,5H)-oxazoledione series) (e.g., 3-ethyl-2-thio-2,4-oxazolidinedione, etc.), those of the thianaphthenone series (e.g., 3(2H)-thianaphthenone, etc.), those of the 2-thio-2,5-thiazolidinedione series (i.e., the 2-thio-2,5(3H,4H)-thiazoledione series) (e.g., 3-ethyl-2-thio-2,5-thiazolidinedione, etc.), those of the 2,4-thiazolidinedione series (e.g., 2,4-thiazolidinedione, 3-ethyl-2,4-thiazolidinedione, 3-phenyl-2,4-thiazolidinedione, 3 - α - naphthyl-2,4-thiazolidinedione, etc.), those of the thiazolidinone series (e.g., 4-thiazolidinone, 3-ethyl-4-thiazolidinone, 3-phenyl-4-thiazolidinone, 3-α-naphthyl-4-thiazolidinone, etc.), those of the 4-thiazolinone series (e.g., 2-ethylmercapto-4-thiazolinone, 2-alkylphenylamino-4-thiazolinones, 2-diphenylamino-4-thiazolinone, etc.), those of the 2-imino-2,4-oxazolinone (i.e., pseudohydantoin) series, those of the 2,4-imidazolinedione (hydantoin) series (e.g., 2,4-imidazolinedione, 3-ethyl-2,4-imidazolinedione, 3-phenyl-2,4-imidazolinedione, 3-α-naphthyl-2,4-imidazolinedione, 1,3-diethyl-2,4-imidiazolinedione, 1-ethyl-3-α-naphthyl-2,4-imidazolinedione, 1,3-diphenyl-2,4-imidazolinedione, etc.), those of the 2-thio-2,4-imidazolinedione (i.e., 2-thiohydantoin) series (e.g., 2-thio-2,4-imidazolinedione, 3-ethyl-2-thio-2,4-imidazolinedione, 3-phenyl-2-thio-2,4-imidazolinedione, 3-α-naphthyl-2-thio-2,4-imidazolinedione, 1,3-diethyl-2-thio-2,4-imidazolinedione, 1-ethyl-3-phenyl-2-thio-2,4-imidazolinedione, 1 - ethyl - 3-α-naphthyl-2-thio-2,4-imidazolinedione, 1,3 - diphenyl - 2-thio-2,4-imidazolinedione, etc.), those of the 5-imidazolinone series (e.g., 2-n-propyl-mercapto-5-imidazolinone, etc.), etc., as well as heterocyclic nuclei containing a sulfone group, such as those described in U.S. Patent 2,748,114 (e.g., 4-thiazolidone-1,1-dioxide, 3(2H)-thianaphthenone-1,1-dioxide, etc.) (especially a heterocyclic nucleus containing 5 atoms in the heterocyclic ring, 3 of said atoms being carbon atoms, 1of said atoms being a nitrogen atom, and 1 of said atoms being selected from the group consisting of a nitrogen atom, an oxygen atom, and a sulfur atom), and Z represents the nonmetallic atoms necessary to complete a heterocyclic nucleus containing from 5 to 6 atoms in the heterocyclic ring, such as those selected from the group consisting of those of the thiazole series (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., naphtho[1,2]thiazole, naphtho[2,1]thiazole, 5 - methoxynaphtho[2,1]thiazole, 5-ethoxynaphtho[2,1]thiazole, 8-methoxynaphtho[1,2]thiazole, 7-methoxynaphtho[1,2]thiazole, etc.), those of the thianaphtheno-7′,6′,4,5-thiazole series (e.g., 4′-methoxythianaphtheno-7′,6′,4,5-thiazole, etc.), those of the oxazole series (e.g., 4-methyloxazole, 5-methyloxazole, 4-phenyl-oxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g., naphtho[1,2]oxazole, naptho[2,1]oxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., naphtho[1,2]selenazole, naptho[2,1]selenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 1-isoquinoline series (e.g., isoquinoline, 3,4-dihydroisoquinoline, etc.), those of the 3-isoquinoline series (e.g., isoquinoline, etc.), those of the benzimidazole series (e.g., 1,3-diethylbenzimidazole, 1-ethyl-3-phenylbenzimidazole, etc.), those of the 3,3-dialkylindolenine series (e.g., 3,3-dimethylindolenine, 3,3,5 - trimethylindolenine, 3,3,7 - trimethylindolenine, etc.), those of the 2-pyridine series (e.g., pyridine, 5-methylpyridine, etc.), those of the 4-pyridine series (e.g., pyridine, etc.), etc.

The merocyanine dyes represented by Formula I above can advantageously be prepared by condensing a compound selected from those represented by the following general formula:

(II)

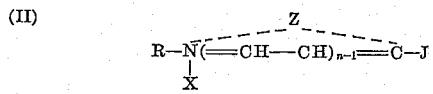

wherein R, n and Z each have the values given above, X represents an acid radical, such as chloride, bromide, iodide, perchlorate, thiocyanate, benzenesulfonate, p-toluenesulfonate, methylsulfate, ethylsufate, etc., and J represents an electronegative group such as:

(IIa)             —S—R$_2$ wherein R$_2$ represents an alkyl group (e.g., methyl, ethyl, etc.) or an aryl group (e.g., phenyl, tolyl, etc.), or:

(IIb)             —CH=CH—N—R$_3$
                                                      R$_4$ wherein R$_3$ represents an acyl group (e.g., acetyl, propionyl, butyryl, benzoyl, etc.), and R$_4$ represents an aryl group (e.g., phenyl, tolyl, etc.), together with a compound selected from those represented by the following general formula:

(III)

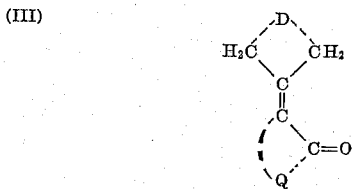

wherein D and Q each have the values given above.

The condensations of the cyclammonium quaternary salts of Formula II with the intermediates represented by Formula III can be accelerated by basic condensing agents, such as the trialkylamines (e.g., triethylamine, tri-n-propylamine, triisopropylamine, tri-n-butylamine, etc.), N,N-dialkylanilines (e.g., N,N-dimethylaniline, N,N-diethylaniline, etc.), N-alkylpiperidines (e.g., N-methylpiperidine, N-ethylpiperidine, etc.), etc. The condensations can be carried out in the presence of an inert diluent, such as the lower alcohols (e.g., ethanol, n-propanol, isopropanol, n-butanol, etc.), 1,4-dioxane, diethyl ether, benzene, etc. The use of basic solvents, such as pyridine, quinoline, isoquinoline, etc. (i.e., heterocyclic tertiary amines) may result in the formation of holopolar cyanine dyes of the type described in our copending application Serial No. 609,525, filed on even date herewith.

The condensations of the cyclammonium quaternary salts of Formula II with the intermediates of Formula III can be accelerated by heat. Temperatures varying from ambient (ca. 25° C.) to the reflux temperature of the reaction mixture can be employed.

The intermediates of Formula III above can advantageously be prepared by condensing a compound selected from those represented by the following general formula:

(IV)

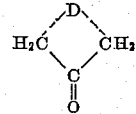

wherein D has the values given above with a ketomethylene compound selected from those represented by the following general formula:

(V)

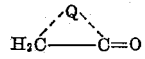

wherein Q has the values given above.

The condensations of the compounds of Formula IV with those of Formula V can be accelerated by strongly basic substances, such as piperidine, etc. Alternatively, a mixture of ammonium acetate and acetic acid can be used to catalyze the condensations. The condensations can be carried out in the presence of an inert diluent, such as the lower alcohols (e.g., ethanol, n-propanol, isopropanol, n-butanol, etc.), chloroform, 1,4-dioxane, pyridine, etc. Heat accelerates the condensations. Temperatures varying from ambient (ca. 25° C.) to the reflux temperature of the reaction mixture can be employed. Kendall et al. U.S. Patent 2,213,986, issued September 10, 1940, describes a method for making certain of the intermediates represented by Formula III above.

The following examples will serve to illustrate more fully the method of making the intermediates represented by Formula III above and the merocyanine dyes of our invention represented by Formula I above.

*Example 1.—5-cyclopentylidene-3-ethylrhodanine*

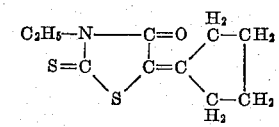

A mixture of 32.2 g. (1 mol.) of 3-ethylrhodanine, 33.6 g. (1 mol. plus 100% excess) of cyclopentanone, 30 ml. of ethyl alcohol and 2.0 ml. of piperidine was heated at the refluxing temperature for 75 minutes. The cool reaction mixture was stirred with water. After chilling, the product was collected on a filter and washed with water. After two recrystallizations from methyl alcohol the yield of intermediate was 89% and the pale yellow needles had M.P. 100.5–101.5° C.

*Example 2.—5-cyclopentylidene-1,3-diethylbarbituric acid*

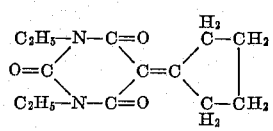

A mixture of 36.8 g. (1 mol.) of 1,3-diethylbarbituric acid, 33.6 g. (1 mol. plus 100% excess) of cyclopentanone, 25 ml. of ethyl alcohol and 1.5 ml. of piperidine was heated at the refluxing temperature for 4½ hours. The cool reaction mixture was stirred with cold water. After chilling, the product was collected on a filter and washed with water. The residue was transferred to a beaker, stirred with a little hot methyl alcohol and chilled. The product was collected on a filter and washed with methyl alcohol. After two recrystallizations from methyl alcohol the yield of intermediate was 50% and the colorless crystals had M.P. 74–75° C.

Example 3.—5-cyclopentylidene-1,3-diethyl-2-thiobarbituric acid

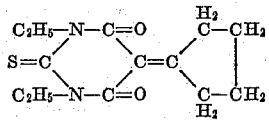

A mixture of 20.0 g. (1 mol.) of 1,3-diethyl-2-thiobarbituric acid, 16.8 g. (1 mol. plus 100% excess) of cyclopentanone, 25 ml. of ethyl alcohol and 0.5 ml. of piperidine was heated at the refluxing temperature for 35 minutes. The cool reaction mixture was stirred with cold water and the whole chilled. The product was collected on a filter and washed with water. After two recrystallizations from methyl alcohol the yield of intermediate was 72% and the yellow needles had M.P. 88.5–90° C.

Example 4.—5-cyclopentylidene-1,3-di(β-methoxyethyl)barbituric acid

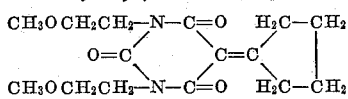

A mixture of 12.2 g. (1 mol.) of 1,3-di(β-methoxyethyl)barbituric acid, 8.4 g. (1 mol. plus 100% excess) of cyclopentanone, 15 ml. of ethyl alcohol and 0.5 ml. of piperidine was heated at the refluxing temperature for 40 minutes. The cool reaction mixture was stirred with cold water and after chilling, the aqueous layer was decanted and the oily residue was stirred with several successive portions of cold water. The residue was recrystallized from water. The pale yellow needles had M.P. 60–62° C.

Example 5.—4-cyclopentylidene-3-phenyl-5(4H)-isoxazolone

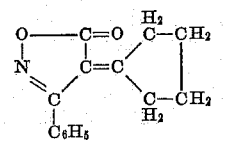

A mixture of 16.1 g. (1 mol.) of 3-phenyl-5(4H)-isoxazolone, 8.4 g. (1 mol.) of cyclopentanone, 2.5 g. of ammonium acetate, 4.0 ml. of acetic acid and 150 ml. of chloroform was heated at the refluxing temperature for 4 hours. A continuous water take-off was used between the flask and the condenser. The cool reaction mixture was washed with three portions of water. The chloroform layer was concentrated to almost dryness. The residue was stirred with a little methyl alcohol, the suspension was chilled and filtered. After two recrystallizations from methyl alcohol, the yield of intermediate was 22% and the almost colorless crystals had M.P. 158–159° C.

Example 6.—4-cyclopentylidene-3-methyl-1-phenyl-5-pyrazolone

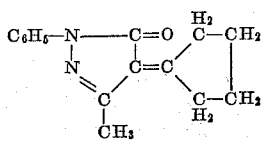

A mixture of 8.7 g. (1 mol.) of 3-methyl-1-phenyl-5-pyrazolone, 8.4 g. (1 mol. plus 100% excess) of cyclopentanone, 25 ml. of ethyl alcohol and 1.0 ml. of piperidine was heated at the refluxing temperature for 15 minutes. After chilling, the product was collected on a filter and washed with cold methyl alcohol. After two recrystallizations from methyl alcohol, the yield of intermediate was 41% and the yellow needles had M.P. 124–125° C.

Example 7.—2-cyclopentylidene-3(2H)-thianaphthenone-1,1-dioxide

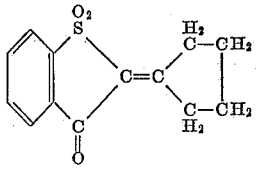

A mixture of 9.05 g. (1 mol.) of 3(2H)-thianaphthenone-1,1-dioxide, 4.2 g. (1 mol.) of cyclopentanone, 2.5 g. of ammonium acetate, 4.0 ml. of acetic acid and 100 ml. of chloroform was heated at the refluxing temperature for 3 hours. A continuous water take-off was used between the flask and the condenser. The cool reaction mixture was washed with three portions of water. The chlorform layer was concentrated to almost dryness. The residue was stirred with a little methyl alcohol, the suspension was chilled and filtered. After two recrystallizations from methyl alcohol, the yield of intermediate was 43% and the cream crystals had M.P. 192–193° C.

Example 8.—5-cyclopentylidene-3-ethyl-1-phenyl-2-thiohydantoin

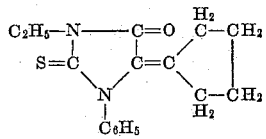

A mixture of 16.8 g. (1 mol. plus 100% excess) of cyclopentanone, 22.0 g. (1 mol.) of 3-ethyl-1-phenyl-2-thiohydantoin and 10.0 ml. of piperidine was heated in an oil bath at 115–125° C. for 2 hours. The cool reaction mixture was stirred with water and filtered. After two recrystallizations from methyl alcohol, the yield of intermediate was 63% and the pale yellowish crystals had M.P. 126–127° C.

Example 9.—5-cyclohexylidene-1,3-diethylbarbituric acid

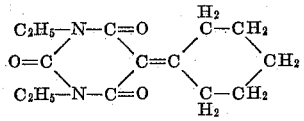

A mixture of 18.4 g. (1 mol.) of 1,3-diethylbarbituric acid, 9.8 g. (1 mol.) of cyclohexanone, 2.5 g. of ammonium acetate, 4.0 ml. of acetic acid and 100 ml. of chloroform was heated at the refluxing temperature for 6 hours. A continuous water take-off was used between the flask and the condenser. The cool reaction mixture was washed with three portions of water. The chloroform layer was concentrated to almost dryness. The residue was stirred with a little methyl alcohol, the suspension was chilled and filtered. The solids were extracted with methyl alcohol. The remaining yellowish crystals were dissolved in pyridine, the solution was filtered and methyl alcohol was added to the filtrate. After chilling, the product was collected on a filter. After a further recrystallization from ethyl alcohol, the yield of intermediate was 23% and the faintly yellowish crystals had M.P. 230–232° C.

Example 10.—5-cyclohexylidene-3-ethylrhodanine

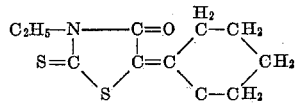

A mixture of 16.1 g. (1 mol.) of 3-ethylrhodanine, 9.8 g. (1 mol.) of cyclohexanone, 2.5 g. of ammonium acetate, 4.0 ml. of acetic acid and 100 ml. of chloroform was heated at the refluxnig temperature 2¼ hours. A continuous water take-off was used between the flask and the condenser. The cool reaction mixture was washed with three portions of water. The chloroform layer was concentrated to almost dryness. The residue was stirred with a little methyl alcohol, the suspension was chilled and filtered. After two recrystallizations from ethyl alcohol, the yield of intermediate was 72% and the faintly yellowish crystals had M.P. 93–94° C.

*Example 11. 4[2-(3-ethyl-2(3H)-benzothiazolylidene)cyclopentylidene]-3-methyl-1-phenyl-5-pyrazolone*

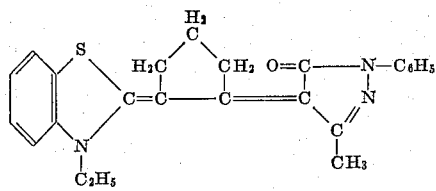

A mixture of 3.09 g. (1 mol.) of 4-cyclopentylidene-3-methyl-1-phenyl-5-pyrazolone, 4.36 g. (1 mol.) of 3-ethyl-2-ethylmercaptobenzothiazolium ethylsulfate, 10 ml. of absolute ethyl alcohol and 1.38 g. (1 mol. plus 10% excess) of triethylamine was heated at the refluxing temperature for 25 minutes. The reaction mixture was chilled, filtered and the residue was washed with cold methyl alcohol. After two recrystallizations from methyl alcohol, the yield of dye was 38%. The reddish crystals had M.P. 212–213° C. with decomposition and previous darkening.

*Example 12.—3-ethyl-5-[2-(3-methyl-2(3H)-benzothiazolylidene)-cyclopentylidene]-1-phenyl-2-thiohydantoin*

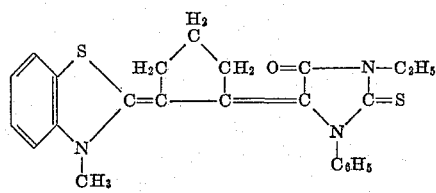

A mixture of 7.16 g. (1 mol.) of 5-cyclopentylidene-3-ethyl-1-phenyl-2-thiohydantoin, 9.18 g. (1 mol.) of 3-methyl-2-methylmercaptobenzothiazolium p-toluenesulfonate, 35 ml. of absolute ethyl alcohol and 2.77 g. (1 mol. plus 10% excess) of triethylamine was heated at the refluxing temperature for 40 minutes. The cool reaction mixture was stirred with water and filtered. The solid and sticky residue were stirred with ethyl alcohol. The alcoholic solution was decanted. The remaining residue was stirred with hot methyl alcohol. After chilling, the dye was collected on a filter and washed with methyl alcohol. The remaining portion was extracted with hot ethyl alcohol and the undissolved dye was dissolved in hot pyridine, the solution was filtered and methyl alcohol was added to the filtrate. The dye was collected on a filter and washed with methyl alcohol. After another recrystallization from ethyl alcohol, the yield of dye was 4%. The dark red crystals with a dark blue reflex had M.P. 256–257° C. with decomposition and they sensitized a photographic gelatino-silver-bromoiodide emulsion to about 610 mu with maximum sensitivity at about 560 mu.

*Example 13. — 3-ethyl-5-[2-(3-methyl-2(3H)-benzothiazolylidene)-cyclopentylidene]-2-thio-2,4-oxazolidinedione*

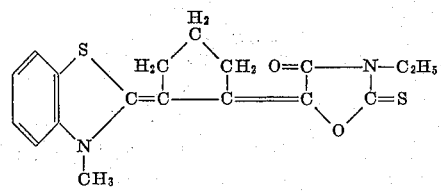

A mixture of 8.4 g. (1 mol. plus 100% excess) of cyclopentanone, 7.25 g. (1 mol.) of 3-ethyl-2-thio-2,4-oxazolidinedione and 5 ml. of piperidine was heated in an oil bath at 106 to 110° C. for 30 minutes. The reaction mixture was stirred with water, ice was added and the aqueous layer was decanted. The residue was dissolved in methyl alcohol and then some water was added. After chilling, the mixture was filtered. The residue, 18.35 g. of 3-methyl-2-methylmercaptobenzothiazolium p-toluenesulfonate, 35 ml. of absolute ethyl alcohol and 5.56 g. of triethylamine were heated together at the refluxing temperature for 45 minutes. The cool reaction mixture was stirred with water. The aqueous layer was decanted, the sticky residue was washed with water and then stirred with hot ligroin (B.P. 100–110° C.). After some days, the solid was collected on a filter and washed with ligroin. After two recrystallizations from ethyl alcohol, the coppery crystals had M.P. 182–183° C. with decomposition and they weighed 1.02 g.

*Example 14.—1,3-diethyl-5-[2-(3-methyl-2(3H)-benzoxazolylidene)cyclopentylidene]-2-thiobarbituric acid*

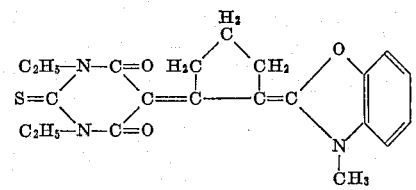

A mixture of 4.9 g. (1 mol. plus 20% excess) of 2-methylmercaptobenzoxazole and 5.58 g. (1 mol. plus 20% excess) of methyl p-toluenesulfonate was heated over a free flame until bubbles appeared and then the reaction mixture was stood at room temperature. The resulting quaternary salt, 6.66 g. (1 mol.) of 5-cyclopentylidene-1,3-diethyl-2-thiobarbituric acid, 30 ml. of absolute ethyl alcohol and 3.02 g. (1 mol. plus 20% excess) of triethylamine was heated at the reflux temperature for 30 minutes. The cool reaction mixture was stirred with cold water and the whole was chilled. The product was collected on a filter and washed with water. The residue was transferred to a beaker and stirred with hot methyl alcohol. After chilling, the dye was collected on a filter and washed with methyl alcohol. After two recrystallizations from methyl alcohol the yield of dye was 20% and the brownish crystals had M.P. 230–232° C. with decomposition.

1,3-diethyl-5-[2-(3-methyl-2(3H)-benzoxazolylidene)-cyclopentylidene]barbituric acid was prepared in like manner by using an equivalent amount of 5-cyclopentylidene-1,3-diethylbarbituric acid instead of the 5-cyclopentylidene-1,3-diethyl-2-thiobarbituric acid in the above example. The yield of dye was 45% crude and 30% after two recrystallizations from ethyl alcohol. The deep yellow crystals had M.P 275–277° C. with decomposition.

*Example 15. — 3-ethyl-5-[2-(3-methyl-2(3H)-benzothiazolylidene)cyclopentylidene]rhodanine*

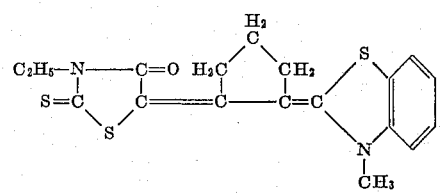

A mixture of 5.68 g. (1 mol.) of 5-cyclopentylidene-3-ethylrhodanine, 9.18 g. (1 mol.) of 3-methyl-2-methylmercaptobenzothiazolium p-toluenesulfonate, 100 ml. of absolute ethyl alcohol and 2.75 g. (1 mol. plus 10% excess) of triethylamine was heated at the refluxing temperature for 30 minutes. The cool reaction mixture was stirred with cold water and the whole was chilled. The product was collected on a filter and washed with water. The dye was dissolved in 50 ml. of hot pyridine, the solution was filtered and 160 ml. of hot methyl alcohol was added to the hot pyridine filtrate. After another such purification the yield of dye was 51%. The dark green needles had M.P. 220–221° C. with decomposition and they sensitized a photographic gelatino-silver-bromo-iodide emulsion to about 630 mu with maximum sensitivity at about 570 mu.

*Example 16.—1,3-diethyl-5 - [2-(3 - methyl-2(3H)benzothiazolylidene)cyclopentylidene]barbituric acid*

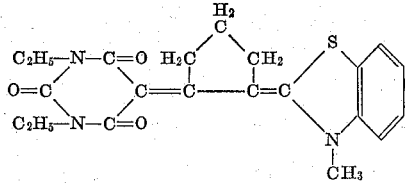

A mixture of 6.25 g. (1 mol.) of 5-cyclopentylidene-1,3-diethylbarbituric acid, 9.17 g. (1 mol.) of 3-methyl-2-methylmercaptobenzothiazolium p-toluenesulfonate, 25 ml. of absolute ethyl alcohol and 2.75 g. (1 mol. plus 10% excess) of triethylamine was heated at the refluxing temperature for 20 minutes. The cool reaction mixture was stirred with cold water and the whole was chilled. The product was collected on a filter and washed with water. The yield of dye was 85% crude and 52% after two recrystallizations from ethyl alcohol. The red crystals had M.P. 274–275° C. with decomposition.

1,3-diethyl-5-[2-(3-ethyl -2(3H)- benzothiazolylidene)-cyclopentylidene]barbituric acid was prepared by using 8.73 g. (1 mol.) of 3-ethyl-2-ethylmercaptobenzothiazolium ethylsulfate instead of the 3-methyl-2-methylmercaptobenzothiazolium p-toluenesulfonate in the above example. The yield of dye was 70% crude and 53% after two recrystallizations from ethyl alcohol. The orange crystals had M.P. 260–261° C. with decomposition.

*Example 17.—1,3-diethyl - 5 - [2-(1-ethyl-2(1H)-naphtho [1,2]thiazolylidene)cyclopentylidene]barbituric acid*

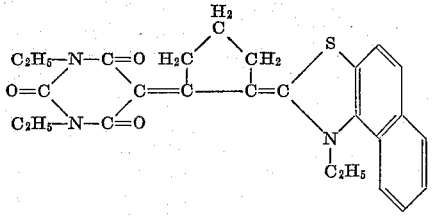

A mixture of 6.25 g. (1 mol.) of 5-cyclopentylidene-1,3-diethylbarbituric acid, 9.98 g. (1 mol.) of 1-ethyl-2-ethylmercaptonaphtho[1,2]thiazolium ethylsulfate, 50 ml. of absolute ethyl alcohol and 2.75 g. (1 mol. plus 10% excess) of triethylamine was heated at the refluxing temperature for 30 minutes. The cool reaction mixture was stirred with cold water and the whole was chilled. The product was collected on a filter and washed with water. The residue was transferred to a beaker and stirred with hot methyl alcohol. After chilling, the dye was collected on a filter and washed with methyl alcohol. The yield of dye was 75% crude and 49% after two recrystallizations from ethyl alcohol. The dull reddish crystals had M.P. 250–251° C. with decomposition.

1,3-diethyl-5-[2-(1-ethyl-2(1H)-naphtho[1,2]thiazolylidene)cyclopentylidene]-2-thiobarbituric acid was prepared in like manner by using an equivalent amount of 5-cyclopentylidene-1,3 - diethyl - 2 - thiobarbituric acid instead of the 5-cyclopentylidene-1,3-diethylbarbituric acid in the above example. The yield of dye was 64% after one recrystallization from methyl alcohol followed by dissolving the crystals in hot pyridine, filtering the solution and adding methyl alcohol to the filtrate. The dark red crystals had M.P. 234–235° C. with decomposition.

*Example 18.—4[2(1-methyl-2(1H)-naphtho[1,2]thiazolylidene)cyclopentylidene]-3-phenyl-5(4H)-isoxazolone*

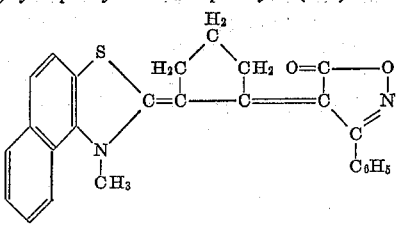

A mixture of 4.54 g. (1 mol.) of 4-cyclopentylidene-3-phenyl-5(4H)-isoxazolone, 7.15 g. (1 mol.) of 1-methyl-2-methylmercaptonaphtho[1,2]thiazolium methylsulfate, 35 ml. of absolute ethyl alcohol and 2.22 g. (1 mol. plus 10% excess) of triethylamine was heated at the refluxing temperature for 20 minutes. The reaction mixture was chilled, filtered and the residue was washed with methyl alcohol. The remaining solid was extracted with hot pyridine. The undissolved dye was dissolved in hot cresol, the solution was filtered and methyl alcohol was added to the filtrate. The dye was collected on a filter, transferred to a beaker, stirred with hot methyl alcohol and the suspension was filtered hot. The yield of dye was 26%. The red crystals with a green reflex had M.P. 260–261° C. with decomposition and they sensitized a photographic gelatino-silver-bromoiodide emulsion to about 540 mu with maximum sensitivity at about 520 mu.

*Example 19.—1,3-di(β-methoxyethyl)-5-[2 - (1 - methyl-2(1H) - naphtho[1,2]thiazolylidene)cyclopentylidene] barbituric acid*

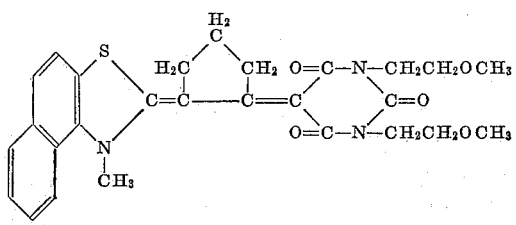

A mixture of 6.20 g. (1 mol.) of 5-cyclopentylidene-1,3-di(β-methoxyethyl)barbituric acid, 7.15 g. (1 mol.) of 1-methyl-2-methylmercaptonaphtho [1,2] thiazolium methylsulfate, 20 ml. of absolute ethyl alcohol and 2.22 g. (1 mol. plus 10% excess) of triethylamine was heated at the refluxing temperature for 20 minutes. The reaction mixture was chilled, filtered and the residue was washed with methyl alcohol. The dye was dissolved in hot pyridine, the solution was filtered and methyl alcohol was added to the filtrate. The dye was collected on a filter and washed with methyl alcohol. After another such purification, the yield of dye was 60%. The orange crystals had M.P. 243–245° C. with decomposition.

*Example 20.—2-[2-(1-ethyl-2(1H)-naphtho [1,2] thiazoylidene)cyclopentylidene] - 3(2H) - thianaphthenone-1,1-dioxide*

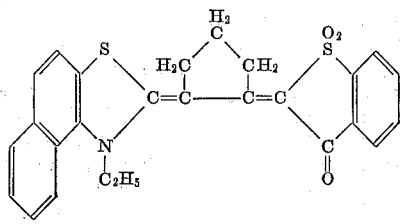

A mixture of 4.96 g. (1 mol.) of 2-cyclopentylidene-3(2H)-thianaphthenone-1,1-dioxide, 7.98 g. (1 mol.) of 1-ethyl-2-ethylmercaptonaphtho [1,2] thiazolium ethylsulfate, 50 ml. of absolute ethyl alcohol and 2.22 g. (1 mol. plus 10% excess) of triethylamine was heated at the refluxing temperature for 30 minutes. The reaction mixture was chilled, filtered and the residue was washed with methyl alcohol. After two recrystallizations from pyridine, the yield of dye was 66%. The shiny red crystals had M.P. 274–275° C. with decomposition and they sensitized a photographic gelatino-silver-bromoiodide emulsion to about 530 mu.

*Example 21.*—3-ethyl-5-[2-(1 - ethyl - 2(1H) - naphtho-[1,2] thiazolylidene)cyclohexylidene]rhodanine

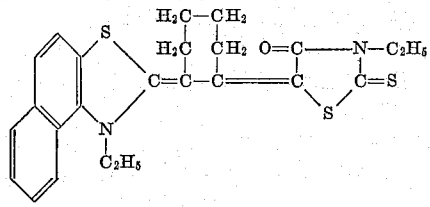

A mixture of 8.02 g. (1 mol.) of 5-cyclohexylidene-3-ethylrhodanine, 13.3 g. (1 mol.) of 1-ethyl-2-ethylmercaptonaphtho[1,2]thiazolium ethylsulfate, 35 ml. of absolute ethyl alcohol and 3.54 g. (1 mol. plus 5% excess) of triethylamine was heated at the refluxing temperature for 25 minutes. The cool reaction mixture was stirred with water. The aqueous layer was decanted and the sticky residue was stirred with hot methyl alcohol. After chilling, the crystals were collected on a filter and washed with methyl alcohol. The dye was dissolved in hot pyridine, the solution was filtered and methyl alcohol was added to the filtrate. After chilling, the crystals were collected on a filter and washed with methyl alcohol. After another such purification, the yield of dye was 18%. The coppery crystals had M.P. 189–191° C. with decomposition and they sensitized a photographic gelatino-silver-bromoiodide emulsion to about 610 mu.

As shown in the above examples, many of the dyes of our invention are particularly useful in manufacturing photographic, silver halide emulsions, serving to alter the sensitivity thereof. Sensitization by means of our new dyes is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Pyridine has proven satisfactory as a solvent for the majority of our new dyes.

The concentration of our new dyes in the emulsion can vary widely, i. e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in pyridine or other suitable solvent and a volume of this solution (which may be diluted with methanol) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The effect of the new dyes of our invention in photographic silver halide emulsions is depicted schematically in the accompanying drawing. In Fig. 1, the solid curve represents the sensitivity of an ordinary photographic gelatino-silver-bromiodide emulsion sensitized with 3-ethyl-5-[2-(3-methyl-2(3H)-benzothiazolylidene)-cyclopentylidene]rhodanine. The preparation of the dye used in this coating is illustrated in Example 15 above.

In Fig. 2, the solid curve represents the sensitivity of an ordinary photographic gelatino-silver-bromiodide emulsion sensitized with 3-ethyl-5-[2-(3-methyl-2(3H)-benzothiazolylidene) - cyclopentylidene]-2-thio - 2,4 - oxazolidinedione. The preparation of the dye used in this coating is illustrated in Example 13 above.

In Fig. 3, the solid curve represents the sensitivity of an ordinary photographic gelatino-silver-bromiodide emulsion sensitized with 3-ethyl-5-[2-(3-methyl-2(3H)-benzothiazolylidene)-cyclopentylidene]-1-phenyl-2 - thiohydantoin. The preparation of the dye used in this coating is illustrated in Example 12 above.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of our invention comprise the customarily employed gelatino-silver-chloride, gelatino-silver - chlorobromide, gelatino-silver-bromide, and gelatino-silver-bromiodide developing-out emulsions.

Photographic silver halide emulsions, such as those listed above, containing the senstizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Patents 2,540,085; 2,597,856 and 2,597,915), various palladium compounds, such as palladium chloride (U.S. 2,540,086), potassium chloropalladate (U.S. 2,598,079), etc., or mixtures of such sensitizers; antifoggants, such as ammonium chloroplatinate (U.S. 2,566,245,), ammonium chloroplatinite (U.S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U.S. 1,763,533), chrome alum (U.S. 1,763,533), glyoxal (U.S. 1,870,354), dibromacrolein (Br. 406,750), etc.; color couplers, such as those described in U.S. Patent 2,423,730, Spence and Carroll U.S. Patent 2,640,776, etc.; or mixtures of such addenda. Dispersing agents for color couplers, such as those set forth in U.S. Patents 2,322,027 and 2,304,940, can also be employed in the above-described emulsions.

What we claim as our invention and desire secured by Letters Patent of the United States is:

1. A photographic silver halide emulsion sensitized with a merocyanine dye selected from those represented by the following general formula:

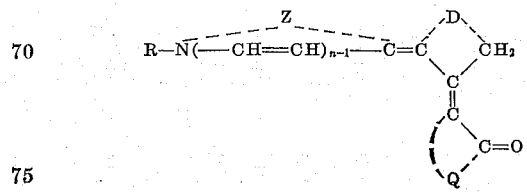

wherein R represents an alkyl group containing from 1 to 4 carbon atoms, $n$ represents a positive integer of from 1 to 2, D represents the atoms necessary to complete a cycloalkane ring containing from 5 to 6 carbon atoms, Q represents the non-metallic atoms necessary to complete a heterocyclic nucleus selected from the group consisting of those of the pyrazolone series, those of the isoxazolone series, those of the 2,4,6-triketohexahydropyrimidine series, those of the rhodanine series, those of the 2-thio-2,4-oxazolidinedione series, and those of the 2-thiohydantoin series, and Z represents the non-metallic atoms necessary to complete a heterocyclic nucleus selected from the group consisting of those of the thiazole series, those of the benzothiazole series, those of the naphthothiazole series, those of the benzoxazole series, those of the naphthoxazole series, those of the benzoselenazole series, those of the naphthoselenazole series, those of the 2-quinoline series, and those of the 4-quinoline series.

2. A photographic silver halide emulsion sensitized with a merocyanine dye selected from those represented by the following general formula:

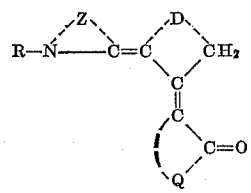

wherein R represents an alkyl group containing from 1 to 4 carbon atoms, D represents the atoms necessary to complete a cycloalkane ring selected from the group consisting of cyclopentane and cyclohexane, Q represents the non-metallic atoms necessary to complete a heterocyclic nucleus selected from the group consisting of those of the pyrazolone series, those of the isoxazolone series, those of the 2,4,6-triketohexahydropyrimidine series, those of the rhodanine series, those of the 2-thio-2,4-oxazolidinedione series, and those of the 2-thiohydantoin series, and Z represents the non-metallic atoms necessary to complete a heterocyclic nucleus of the benzothiazole series.

3. A photographic silver halide emulsion sensitized with a merocyanine dye selected from those represented by the following general formula:

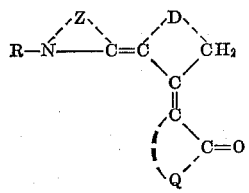

wherein R represents an alkyl group containing from 1 to 4 carbon atoms, D represents the atoms necessary to complete a cycloalkane ring selected from the group consisting of cyclopentane and cyclohexane, Q represents the non-metallic atoms necessary to complete a heterocyclic nucleus selected from the group consisting of those of the pyrazolone series, those of the isoxazolone series, those of the 2,4,6-triketohexahydropyrimidine series, those of the rhodanine series, those of the 2-thio-2,4-oxazolidinedione series, and those of the 2-thiohydantoin series, and Z represents the non-metallic atoms necessary to complete a heterocyclic nucleus of the naphthothiazole series.

4. A photographic silver halide emulsion sensitized with a merocyanine dye selected from those represented by the following general formula:

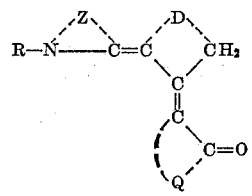

wherein R represents an alkyl group containing from 1 to 4 carbon atoms, D represents the atoms necessary to complete a cycloalkane ring selected from the group consisting of cyclopentane and cyclohexane, Q represents the non-metallic atoms necessary to complete a heterocyclic nucleus selected from the group consisting of those of the pyrazolone series, those of the isoxazolone series, those of the 2,4,6-triketohexahydropyrimidine series, those of the rhodanine series, those of the 2-thio-2,4-oxazolidinedione series, and those of the 2-thiohydantoin series, and Z represents the non-metallic atoms necessary to complete a heterocyclic nucleus of the benzoxazole series.

5. A photographic silver halide emulsion sensitized with the merocyanine dye represented by the following formula:

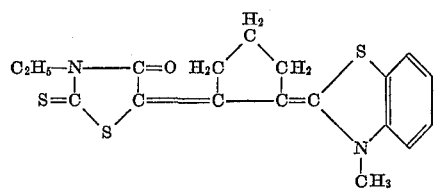

6. A photographic silver halide emulsion sensitized with the merocyanine dye represented by the following formula:

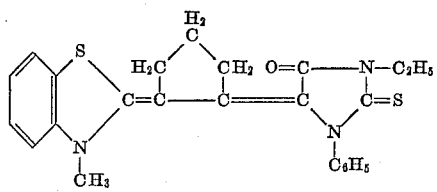

7. A photographic silver halide emulsion sensitized with the merocyanine dye represented by the following formula:

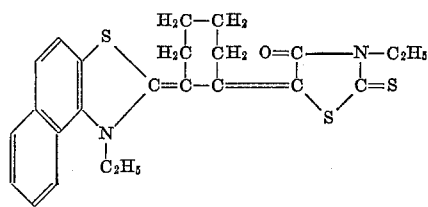

8. A photographic silver halide emulsion sensitized with the merocyanine dye represented by the following formula:

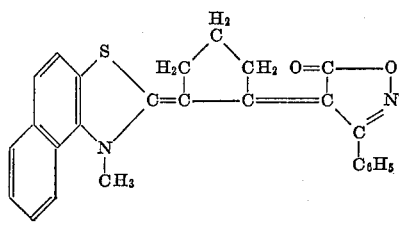

9. A photographic silver halide emulsion sensitized with the merocyanine dye represented by the following formula:

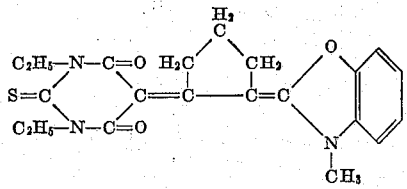

References Cited in the file of this patent

UNITED STATES PATENTS

| | | |
|---|---|---|
| 2,177,401 | Brooker | Oct. 24, 1939 |
| 2,340,882 | Kendall | Feb. 8, 1944 |
| 2,369,355 | Kendall et al. | Feb. 13, 1945 |
| 2,490,572 | Anish | Dec. 6, 1949 |
| 2,493,747 | Brooker et al. | Jan. 10, 1950 |
| 2,692,829 | Aubert et al. | Oct. 26, 1954 |

FOREIGN PATENTS

| | | |
|---|---|---|
| 61,612 | Netherlands | Sept. 15, 1948 |
| 684,187 | Great Britain | Dec. 10, 1952 |
| 538,343 | Italy | Jan. 23, 1956 |

OTHER REFERENCES

C.A. 16, 3101 (copy in S.L.) (abstract of Brit. Med. Journal, 1922 I, 514–5).

C.A. 19, 530 (copy in S.L.) (abstract of Proc. Roy. SOC, London, 96B, 317–33, 1924).